United States Patent
Kerofsky

(10) Patent No.: US 9,083,969 B2
(45) Date of Patent: Jul. 14, 2015

(54) METHODS AND SYSTEMS FOR INDEPENDENT VIEW ADJUSTMENT IN MULTIPLE-VIEW DISPLAYS

(75) Inventor: Louis Joseph Kerofsky, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 2060 days.

(21) Appl. No.: 11/202,903

(22) Filed: Aug. 12, 2005

(65) Prior Publication Data
US 2007/0035565 A1    Feb. 15, 2007

(51) Int. Cl.
*G09G 5/10*    (2006.01)
*H04N 13/04*    (2006.01)

(52) U.S. Cl.
CPC ................. *H04N 13/0497* (2013.01)

(58) Field of Classification Search
USPC .................................................. 345/690, 694
See application file for complete search history.

(56) References Cited

U.S. PATENT DOCUMENTS

| | | |
|---|---|---|
| 4,020,462 A | 4/1977 | Morrin |
| 4,196,452 A | 4/1980 | Warren et al. |
| 4,223,340 A | 9/1980 | Bingham et al. |
| 4,268,864 A | 5/1981 | Green |
| 4,399,461 A | 8/1983 | Powell |
| 4,402,006 A | 8/1983 | Karlock |
| 4,523,230 A | 6/1985 | Harlan |
| 4,536,796 A | 8/1985 | Harlan |
| 4,549,212 A | 10/1985 | Bayer |
| 4,553,165 A | 11/1985 | Bayer |
| 4,709,262 A | 11/1987 | Spieth et al. |
| 4,847,603 A | 7/1989 | Blanchard |
| 4,962,426 A | 10/1990 | Naoi et al. |
| 5,025,312 A | 6/1991 | Faroudja |
| 5,046,834 A | 9/1991 | Dietrich |
| 5,081,529 A | 1/1992 | Collette |
| 5,176,224 A | 1/1993 | Spector |
| 5,218,649 A | 6/1993 | Kundu et al. |
| 5,227,869 A | 7/1993 | Degawa |
| 5,235,434 A | 8/1993 | Wober |
| 5,260,791 A | 11/1993 | Lubin |
| 5,270,818 A | 12/1993 | Ottenstein |
| 5,389,978 A | 2/1995 | Jeong-Hun |
| 5,526,446 A | 6/1996 | Adelson |
| 5,528,257 A | 6/1996 | Okumura et al. |

(Continued)

FOREIGN PATENT DOCUMENTS

| | | |
|---|---|---|
| EP | 0841652 | 5/1998 |
| EP | 963112 | 12/1999 |

(Continued)

OTHER PUBLICATIONS

A. Iranli, W. Lee, and M. Pedram, "HVS—Aware Dynamic Backlight Scaling in TFT LCD's", Very Large Scale Integration (VLSI) Systems, IEEE Transactions vol. 14 No. 10 pp. 1103-1116, 2006.

(Continued)

*Primary Examiner* — Dennis Joseph
(74) *Attorney, Agent, or Firm* — Chernoff Vilhauer McClung & Stenzel, LLP

(57) ABSTRACT

Embodiments of the present invention comprise systems, methods and devices for independently increasing the perceived brightness of a view in a multiple-view display. In some embodiments this increase compensates for a decrease in display light-source illumination.

13 Claims, 11 Drawing Sheets

(56) References Cited

U.S. PATENT DOCUMENTS

| | | |
|---|---|---|
| 5,651,078 A | 7/1997 | Chan |
| 5,696,852 A | 12/1997 | Minoura et al. |
| 5,760,760 A | 6/1998 | Helms |
| 5,808,697 A | 9/1998 | Fujimura et al. |
| 5,857,033 A | 1/1999 | Kim |
| 5,912,992 A | 6/1999 | Sawanda et al. |
| 5,920,653 A | 7/1999 | Silverstein |
| 5,952,992 A | 9/1999 | Helms |
| 5,956,014 A | 9/1999 | Kuriyama et al. |
| 6,055,340 A | 4/2000 | Nagao |
| 6,075,563 A | 6/2000 | Hung |
| 6,275,207 B1 | 8/2001 | Nitta et al. |
| 6,278,421 B1 | 8/2001 | Ishida et al. |
| 6,285,798 B1 | 9/2001 | Lee |
| 6,317,521 B1 | 11/2001 | Gallagher et al. |
| 6,424,730 B1 | 7/2002 | Wang et al. |
| 6,445,835 B1 | 9/2002 | Qian |
| 6,504,953 B1 | 1/2003 | Behrends |
| 6,507,668 B1 | 1/2003 | Park |
| 6,516,100 B1 | 2/2003 | Qian |
| 6,546,741 B2 | 4/2003 | Yun et al. |
| 6,560,018 B1 | 5/2003 | Swanson |
| 6,573,961 B2 | 6/2003 | Jiang et al. |
| 6,583,579 B2 | 6/2003 | Tsumura |
| 6,593,934 B1 | 7/2003 | Liaw et al. |
| 6,594,388 B1 | 7/2003 | Gindele et al. |
| 6,600,470 B1 | 7/2003 | Tsuda |
| 6,618,042 B1 | 9/2003 | Powell |
| 6,618,045 B1 | 9/2003 | Lin |
| 6,628,823 B1 | 9/2003 | Holm |
| 6,677,959 B1 | 1/2004 | James |
| 6,728,416 B1 | 4/2004 | Gallagher |
| 6,753,835 B1 | 6/2004 | Sakai |
| 6,782,137 B1 | 8/2004 | Avinash |
| 6,788,280 B2 | 9/2004 | Ham |
| 6,795,063 B2 | 9/2004 | Endo et al. |
| 6,809,717 B2 | 10/2004 | Asao et al. |
| 6,809,718 B2 | 10/2004 | Wei et al. |
| 6,816,141 B1 | 11/2004 | Fergason |
| 6,816,156 B2 | 11/2004 | Sukeno et al. |
| 6,934,772 B2 | 8/2005 | Bui et al. |
| 7,006,688 B2 | 2/2006 | Zaklika et al. |
| 7,010,160 B1 | 3/2006 | Yoshida |
| 7,068,328 B1 | 6/2006 | Mino |
| 7,088,388 B2 | 8/2006 | MacLean et al. |
| 7,098,927 B2 | 8/2006 | Daly et al. |
| 7,110,062 B1 | 9/2006 | Whitted et al. |
| 7,142,218 B2 | 11/2006 | Yoshida |
| 7,142,712 B2 | 11/2006 | Maruoka et al. |
| 7,158,686 B2 | 1/2007 | Gindele |
| 7,199,776 B2 | 4/2007 | Ikeda et al. |
| 7,202,458 B2 | 4/2007 | Park |
| 7,221,408 B2 | 5/2007 | Kim |
| 7,253,814 B2 | 8/2007 | Kim et al. |
| 7,259,769 B2 | 8/2007 | Diefenbaugh |
| 7,287,860 B2 | 10/2007 | Yoshida et al. |
| 7,289,154 B2 | 10/2007 | Gindele |
| 7,317,439 B2 | 1/2008 | Hata et al. |
| 7,330,287 B2 | 2/2008 | Sharman |
| 7,352,347 B2 | 4/2008 | Fergason |
| 7,352,352 B2 | 4/2008 | Oh et al. |
| 7,394,448 B2 | 7/2008 | Park et al. |
| 7,403,318 B2 | 7/2008 | Miyazawa et al. |
| 7,433,096 B2 | 10/2008 | Chase et al. |
| 7,443,377 B2 | 10/2008 | Kim |
| 7,532,239 B2 | 5/2009 | Hayaishi |
| 7,564,438 B2 | 7/2009 | Kao et al. |
| 7,639,220 B2 | 12/2009 | Yoshida et al. |
| 2001/0031084 A1 | 10/2001 | Cannata et al. |
| 2002/0008784 A1 | 1/2002 | Shirata et al. |
| 2002/0057238 A1 | 5/2002 | Nitta |
| 2002/0167629 A1 | 11/2002 | Blanchard |
| 2002/0181797 A1 | 12/2002 | Young |
| 2003/0001815 A1 | 1/2003 | Cui |
| 2003/0012437 A1 | 1/2003 | Zaklika et al. |
| 2003/0051179 A1 | 3/2003 | Tsirkel et al. |
| 2003/0053690 A1 | 3/2003 | Trifonov et al. |
| 2003/0058464 A1 | 3/2003 | Loveridge et al. |
| 2003/0146919 A1 | 8/2003 | Kawashima |
| 2003/0169248 A1 | 9/2003 | Kim |
| 2003/0179213 A1 | 9/2003 | Liu |
| 2003/0193472 A1 | 10/2003 | Powell |
| 2003/0201968 A1 | 10/2003 | Itoh |
| 2003/0223634 A1 | 12/2003 | Gallagher et al. |
| 2003/0227577 A1 | 12/2003 | Allen et al. |
| 2003/0235342 A1 | 12/2003 | Gindele |
| 2004/0001184 A1 | 1/2004 | Gibbons et al. |
| 2004/0081363 A1* | 4/2004 | Gindele et al. ............... 382/260 |
| 2004/0095531 A1 | 5/2004 | Jiang et al. |
| 2004/0113905 A1 | 6/2004 | Mori et al. |
| 2004/0113906 A1 | 6/2004 | Lew et al. |
| 2004/0119950 A1 | 6/2004 | Penn |
| 2004/0130556 A1 | 7/2004 | Nokiyama |
| 2004/0160435 A1 | 8/2004 | Cui et al. |
| 2004/0170316 A1 | 9/2004 | Saquib |
| 2004/0198468 A1 | 10/2004 | Patel et al. |
| 2004/0201562 A1 | 10/2004 | Funamoto |
| 2004/0207609 A1 | 10/2004 | Hata |
| 2004/0207635 A1 | 10/2004 | Miller et al. |
| 2004/0208363 A1 | 10/2004 | Berge et al. |
| 2004/0239612 A1 | 12/2004 | Asao |
| 2004/0257324 A1 | 12/2004 | Hsu |
| 2005/0001801 A1 | 1/2005 | Kim |
| 2005/0057484 A1 | 3/2005 | Diefenbaugh et al. |
| 2005/0104837 A1 | 5/2005 | Baik |
| 2005/0104839 A1 | 5/2005 | Baik |
| 2005/0104840 A1 | 5/2005 | Sohn et al. |
| 2005/0104841 A1 | 5/2005 | Sohn et al. |
| 2005/0117186 A1 | 6/2005 | Li et al. |
| 2005/0117798 A1 | 6/2005 | Patton et al. |
| 2005/0140616 A1 | 6/2005 | Sohn et al. |
| 2005/0140639 A1 | 6/2005 | Oh et al. |
| 2005/0147317 A1 | 7/2005 | Daly et al. |
| 2005/0152614 A1 | 7/2005 | Daly et al. |
| 2005/0184952 A1 | 8/2005 | Konno |
| 2005/0190142 A1 | 9/2005 | Ferguson |
| 2005/0195212 A1 | 9/2005 | Kurumisawa |
| 2005/0200868 A1 | 9/2005 | Yoshida |
| 2005/0212972 A1* | 9/2005 | Suzuki ........................ 348/607 |
| 2005/0232482 A1 | 10/2005 | Ikeda et al. |
| 2005/0244053 A1 | 11/2005 | Hayaishi |
| 2005/0248503 A1* | 11/2005 | Schobben et al. ............... 345/7 |
| 2005/0248593 A1 | 11/2005 | Feng et al. |
| 2005/0270265 A1 | 12/2005 | Plut |
| 2006/0012987 A9 | 1/2006 | Ducharme et al. |
| 2006/0015758 A1 | 1/2006 | Yoon et al. |
| 2006/0061563 A1 | 3/2006 | Fleck |
| 2006/0072158 A1 | 4/2006 | Christie |
| 2006/0077405 A1 | 4/2006 | Topfer et al. |
| 2006/0120489 A1 | 6/2006 | Lee |
| 2006/0146236 A1 | 7/2006 | Wu et al. |
| 2006/0174105 A1 | 8/2006 | Park |
| 2006/0209005 A1 | 9/2006 | Pedram et al. |
| 2006/0221046 A1 | 10/2006 | Sato |
| 2006/0238827 A1 | 10/2006 | Ikeda |
| 2006/0256840 A1 | 11/2006 | Alt |
| 2006/0284822 A1 | 12/2006 | Kerofsky |
| 2006/0284823 A1 | 12/2006 | Kerofsky |
| 2006/0284882 A1 | 12/2006 | Kerofsky et al. |
| 2007/0001997 A1 | 1/2007 | Kim et al. |
| 2007/0002004 A1 | 1/2007 | Woo |
| 2007/0018951 A1 | 1/2007 | Nobori et al. |
| 2007/0092139 A1 | 4/2007 | Daly |
| 2007/0097069 A1 | 5/2007 | Kurokawa |
| 2007/0103418 A1 | 5/2007 | Ogino |
| 2007/0126757 A1 | 6/2007 | Itoh |
| 2007/0146236 A1 | 6/2007 | Kerofsky et al. |
| 2007/0268524 A1 | 11/2007 | Nose |
| 2008/0037867 A1 | 2/2008 | Lee |
| 2008/0055228 A1 | 3/2008 | Glen |
| 2008/0074372 A1 | 3/2008 | Baba |
| 2008/0094426 A1 | 4/2008 | Kimpe |
| 2008/0180373 A1 | 7/2008 | Mori |
| 2008/0208551 A1 | 8/2008 | Kerofsky et al. |

(56) References Cited

U.S. PATENT DOCUMENTS

| | | | |
|---|---|---|---|
| 2008/0231581 | A1 | 9/2008 | Fujine et al. |
| 2008/0238840 | A1 | 10/2008 | Raman et al. |
| 2009/0002285 | A1 | 1/2009 | Baba |
| 2009/0015602 | A1 | 1/2009 | Rumreich et al. |
| 2009/0051714 | A1 | 2/2009 | Ohhara |
| 2009/0167658 | A1 | 7/2009 | Yamane et al. |
| 2009/0167673 | A1 | 7/2009 | Kerofsky et al. |
| 2009/0174636 | A1 | 7/2009 | Kohashikawa et al. |

FOREIGN PATENT DOCUMENTS

| | | |
|---|---|---|
| EP | 1788550 | 5/2007 |
| FR | 2782566 | 2/2000 |
| JP | 3102579 | 4/1991 |
| JP | 3284791 | 12/1991 |
| JP | 8009154 | 1/1996 |
| JP | 11194317 | 7/1999 |
| JP | 200056738 | 2/2000 |
| JP | 2000148072 | 5/2000 |
| JP | 2000259118 | 9/2000 |
| JP | 2001057650 | 2/2001 |
| JP | 2001083940 | 3/2001 |
| JP | 2001086393 | 3/2001 |
| JP | 2001298631 | 10/2001 |
| JP | 2001350134 | 12/2001 |
| JP | 2002189450 | 7/2002 |
| JP | 2003259383 | 9/2003 |
| JP | 2003271106 | 9/2003 |
| JP | 2003316318 | 11/2003 |
| JP | 2004007076 | 1/2004 |
| JP | 2004020991 A | 1/2004 |
| JP | 200445634 | 2/2004 |
| JP | 2004129265 A | 4/2004 |
| JP | 2004133577 | 4/2004 |
| JP | 2004177547 | 6/2004 |
| JP | 2004272156 | 9/2004 |
| JP | 2004287420 | 10/2004 |
| JP | 2004325628 | 11/2004 |
| JP | 2005346032 | 12/2005 |
| JP | 2006042191 | 2/2006 |
| JP | 2006317757 | 11/2006 |
| JP | 2007093990 | 4/2007 |
| JP | 2007212628 | 8/2007 |
| JP | 2007272023 | 10/2007 |
| JP | 2007299001 | 11/2007 |
| JP | 2009109876 | 5/2009 |
| WO | WO02099557 | 12/2002 |
| WO | WO03039137 | 5/2003 |
| WO | WO2004075155 | 9/2004 |
| WO | WO2005029459 | 3/2005 |

OTHER PUBLICATIONS

L. Kerofsky and S. Daly "Brightness preservation for LCD backlight reduction" SID Symposium Digest vol. 37, 1242-1245 (2006).
L. Kerofsky and S. Daly "Addressing Color in brightness preservation for LCD backlight reduction" ADEAC 2006 pp. 159-162.
L. Kerofsky "LCD Backlight Selection through Distortion Minimization", IDW 2007 pp. 315-318.
International Application No. PCT/JP08/053895 International Search Report.
U.S. Appl. No. 11/154,054—Office Action dated Aug. 5, 2008.
U.S. Appl. No. 11/460,940—Office Action dated Aug. 7, 2008.
Wei-Chung Cheng and Massoud Pedram, "Power Minimization in a Backlit TFT-LCD Display by Concurrent Brightness and Contrast Scaling" IEEE Transactions on Consumer Electronics, Vo. 50, No. 1, Feb. 2004.
Insun Hwang, Cheol Woo Park, Sung Chul Kang and Dong Sik Sakong, "Image Synchronized Brightness Control" SID Symposium Digest 32, 492 (2001).
Inseok Choi, Hojun Shim and Naehyuck Chang, "Low-Power Color TFT LCD Display for Hand-Held Embedded Systems", In ISLPED, 2002.
A Iranli, H. Fatemi, and M. Pedram, "HEBS: Histogram equalization for backlight scaling," Proc. of Design Automation and Test in Europe, Mar. 2005, pp. 346-351.
Chang, N., Choi, I., and Shim, H. 2004. DLS: dynamic backlight luminance scaling of liquid crystal display. IEEE Trans. Very Large Scale Integr. Syst. 12, 8 (Aug. 2004), 837-846.
S. Pasricha M Luthra, S. Mohapatra, N. Dutt, N. Venkatasubramanian, "Dynamic Backlight Adaptation for Low Power Handheld Devices," To appear in IEEE Design and Test (IEEE D&T), Special Issue on Embedded Systems for Real Time Embedded Systems, Sep. 8, 2004.
H. Shim, N. Chang, and M. Pedram, "A backlight power management framework for the battery-operated multi-media systems." IEEE Design and Test Magazine, Sep./Oct. 2004, pp. 388-396.
F. Gatti, A. Acquaviva, L. Benini, B. Ricco', "Low-Power Control Techniques for TFT LCD Displays," Compiler. Architectures and Synthesis of Embedded Systems, Oct. 2002.
Ki-Duk Kim, Sung-Ho Baik, Min-Ho Sohn, Jae-Kyung Yoon, Eui-Yeol Oh and In-Jae Chung. "Adaptive Dynamic Image Control for IPS-Mode LCD TV", SID Symposium Digest 35, 1548 (2004).
Raman and Hekstra. "Content Based Contrast Enhancement for Liquid Crystal Displays with Backlight Modulation", IEEE Transactions on Consumer Electronics, vol. 51, No. 1, Feb. 2005.
E.Y. Oh, S. H. Balik, M. H. Sohn. K. D. Kim, H. J. Hong. J.Y. Bang, K.J. Kwon, M.H. Kim, H. Jang, J.K. Yoon and I.J. Chung, "IPS-mode dynamic LCD-TV realization with low black luminance and high contrast by adaptive dynamic image control technology", Journal of the Society for Information Display, Mar. 2005, vol. 13, Issue 3, pp. 181-266.
Febritus, Grigore, Muang, Loukusa, Mikkonen, "Towards energy aware system design", Online via Nokia (http://www.nokia.com/nokia/0,,53712,00.html).
Choi, I., Kim, H.S., Shin, H. and Chang, N. "LPBP: Low-power basis profile of the Java 2 micro edition" in Proceedings of the 2003 International Symposium on Low Power Electronics and Design (Seoul, Korea, Aug. 2003) ISPLED '03. ACM Press, New York, NY, p. 36-39.
International Search Report for PCT Application No. PCT/US05/43640.
International Application No. PCT/US2005/043641 International Preliminary Report on Patentability.
International Application No. PCT/US05/043560 International Search Report.
International Application No. PCT/US05/043560 International Preliminary Examination Report.
International Application No. PCT/US05/043641 International Search Report.
International Application No. PCT/US05/043647 International Search Report.
International Application No. PCT/US05/043647 International Preliminary Examination Report.
International Application No. PCT/US05/043640 International Search Report.
International Application No. PCT/US05/043646 International Search Report.
International Application No. PCT/US05/043646 International Preliminary Examination Report.
U.S. Appl. No. 11/154,054—Office Action dated Mar. 25, 2008.
U.S. Appl. No. 11/293,066—Office Action dated Jan. 1, 2008.
U.S. Appl. No. 11/371,466—Office Action dated Oct. 5, 2007.
U.S. Appl. No. 11/371,466—Office Action dated Apr. 11, 2008.
International Application No. PCT/JP08/064669 International Search Report.
Richard J. Qian, et al, "Image Retrieval Using Blob Histograms", Proceeding of 2000 IEEE International Conference on Multimedia and Expo, vol. 1, Aug. 2, 2000, pp. 125-128.
U.S. Appl. No. 11/154,054—Office Action dated Dec. 30, 2008.
U.S. Appl. No. 11/154,053—Office Action dated Oct. 1, 2008.
U.S. Appl. No. 11/460,940—Notice of Allowance dated Dec. 15, 2008.
U.S. Appl. No. 11/224,792—Office Action dated Nov. 10, 2008.
U.S. Appl. No. 11/371,466—Office Action dated Sep. 23, 2008.

(56) References Cited

OTHER PUBLICATIONS

PCT App. No. PCT/JP2008/064669—Invitation to Pay Additional Fees dated Sep. 29, 2008.
PCT App. No. PCT/JP2008/069815—Invitation to Pay Additional Fees dated Dec. 5, 2005.
International Application No. PCT/JP08/069815 International Search Report.
International Application No. PCT/JP08/072215 International Search Report.
International Application No. PCT/JP08/073898 International Search Report.
International Application No. PCT/JP08/073146 International Search Report.
International Application No. PCT/JP08/072715 International Search Report.
International Application No. PCT/JP08/073020 International Search Report.
International Application No. PCT/JP08/072001 International Search Report.
International Application No. PCT/JP04/013856 International Search Report.
PCT App. No. PCT/JP08/071909—Invitation to Pay Additional Fees dated Jan. 13, 2009.
U.S. Appl. No. 11/154,052—Office Action dated Apr. 27, 2009.
U.S. Appl. No. 11/154,053—Office Action dated Jan. 26, 2009.
U.S. Appl. No. 11/224,792—Office Action dated Apr. 15, 2009.
U.S. Appl. No. 11/293,066—Office Action dated May 16, 2008.
U.S. Appl. No. 11/371,466—Office Action dated Apr. 14, 2009.
International Application No. PCT/JP08/071909 International Search Report.
PCT App. No. PCT/JP08/073020—Replacement Letter dated Apr. 21, 2009.
U.S. Appl. No. 11/564,203—Non-final Office Action dated Sep. 24, 2009.
U.S. Appl. No. 11/154,052—Non-final Office Action dated Nov. 10, 2009.
U.S. Appl. No. 11/154,054—Final Office Action dated Jun. 24, 2009.
U.S. Appl. No. 11/154,053—Non-final Office Action dated Jul. 23, 2009.
U.S. Appl. No. 11/224,792—Non-final Office Action dated Nov. 18, 2009.
U.S. Appl. No. 11/371,466—Non-final Office Action dated Dec. 14, 2009.
U.S. Appl. No. 11/154,054—Non-final Office Action dated Jan. 7, 2009.
U.S. Appl. No. 11/293,562—Non-final Office Action dated Jan. 7, 2009.
U.S. Appl. No. 11/564,203—Notice of Allowance dated Apr. 2, 2010.
U.S. Appl. No. 11/154,052—Notice of Allowance dated May 21, 2010.
U.S. Appl. No. 11/154,053—Final Office Action dated Mar. 4, 2010.
U.S. Appl. No. 11/293,066—Non-Final Office Action dated Mar. 2, 2010.
U.S. Appl. No. 11/465,436—Notice of Allowance dated Apr. 20, 2010.
U.S. Appl. No. 11/680,539—Non-Final Office Action dated May 19, 2010.
U.S. Appl. No. 11/224,792—Final Office Action dated Jun. 11, 2010.
U.S. Appl. No. 11/154,054—Final Office Action dated Aug. 9, 2010.
U.S. Appl. No. 11/293,562—Final Office Action dated Jul. 8, 2010.
U.S. Appl. No. 11/371,466—Notice of Allowance dated Jul. 13, 2010.
U.S. Appl. No. 11/460,907—Non-Final Office Action dated Aug. 30, 2010.
U.S. Appl. No. 11/293,066—Final Office Action dated Oct. 1, 2010.
U.S. Appl. No. 11/460,768—Non-Final Office Action dated Sep. 3, 2010.
U.S. Appl. No. 11/680,312—Non-Final Office Action dated Sep. 9, 2010.
U.S. Appl. No. 11/948,969—Non-Final Office Action dated Oct. 4, 2010.
Rafal Mantiuk, Scott Daly, Louis Kerofsky, "Display Adaptive Tone Mapping", ACM Transactions on Graphics, Aug. 2008, vol. 27, No. 3, Article 68.
Pierre De Greef and Hendriek Groot Hulze NXP Semiconductors (Founded by Philips) et al: "39.1: Adaptive Dimming and Boosting Backlight for LCD-TV Systems", SID 2007, 2007 SID International Symposium, Society for Information Display, Los Angeles, USA, vol. XXXVIII, May 20, 2007, pp. 1332-1335, XP007013259, ISSN: 0007-966X.
International Application No. PCT/JP2010/064123 International Search Report.
International Application No. PCT/JP2008/072215 European Search Report.
International Application No. PCT/JP2008/0723020 European Search Report.
International Application No. PCT/JP2008/069815 European Search Report.
U.S. Appl. No. 11/293,562—Notice of Allowance dated Dec. 8, 2010.
U.S. Appl. No. 11/224,792—Notice of Allowance dated Feb. 9, 2011.
U.S. Appl. No. 11/964,683—Non-final Office Action dated Dec. 28, 2010.
U.S. Appl. No. 11/154,053—Non-final Office Action dated Mar. 1, 2011.
U.S. Appl. No. 11/964,691—Non-final Office Action dated Mar. 3, 2011.
Decision to Grant issued by the Japanese Patent Office on Apr. 3, 2012 in Japanese Patent App. No. 2006-105489, Sharp Kabushiki Kaisha, 2 pgs.

* cited by examiner

US 9,083,969 B2

METHODS AND SYSTEMS FOR INDEPENDENT VIEW ADJUSTMENT IN MULTIPLE-VIEW DISPLAYS

FIELD OF THE INVENTION

Embodiments of the present invention comprise methods and systems for independently enhancing the brightness, contrast and other qualities of each view of a multiple-view display.

BACKGROUND

A typical display device displays an image using a fixed range of luminance levels. For many displays, the luminance range has 256 levels that are uniformly spaced from 0 to 255. Image code values are generally assigned to match these levels directly.

Many display devices, such as liquid crystal displays (LCDs) or digital micro-mirror devices (DMDs), use light valves which are backlit, side-lit or front-lit in one way or another. In a backlit light valve display, such as an LCD, a backlight is positioned behind a liquid crystal panel. The backlight radiates light through the LC panel, which modulates the light to register an image. Both luminance and color can be modulated in color displays. The individual LC pixels modulate the amount of light that is transmitted from the backlight and through the LC panel to the user's eyes or some other destination. In some cases, the destination may be a light sensor, such as a coupled-charge device (CCD).

Some displays may also use light emitters to register an image. These displays, such as light emitting diode (LED) displays and plasma displays use picture elements that emit light rather than reflect light from another source.

SUMMARY

Some embodiments of the present invention comprise systems and methods for varying a light-valve-modulated pixel's luminance modulation level to vary the brightness of a displayed image independent of a light source (backlight) or to improve the image quality at a fixed light source illumination level.

Some embodiments of the present invention may also be used with displays that use light emitters to register an image. These displays, such as light emitting diode (LED) displays and plasma displays use picture elements that emit light rather than reflect light from another source. Embodiments of the present invention may be used to enhance the image produced by these devices. In these embodiments, the brightness of pixels may be adjusted to enhance the dynamic range of specific image frequency bands, luminance ranges and other image subdivisions.

Some embodiments of the present invention comprise dual-view or multiple-view displays that display multiple images on a single display. These displays display a different image depending on the orientation of the viewer to the display screen. In some embodiments, a viewer located to the right side of a display will perceive one image while a viewer located to the left side of the display will perceive a second image. Similarly, a display can be "split" vertically with a viewer located above the display perceiving an image different than one seen by a viewer located below the display. This is typically achieved by constructing groups or patterns of pixel light-valves that project light in a particular viewing direction or allow light to be projected through them in a particular viewing direction.

Some embodiments of the present invention comprise systems and methods for adjusting the perceived brightness of one image on a multiple-view display independent of the other views and independent of the light source (e.g., backlight).

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
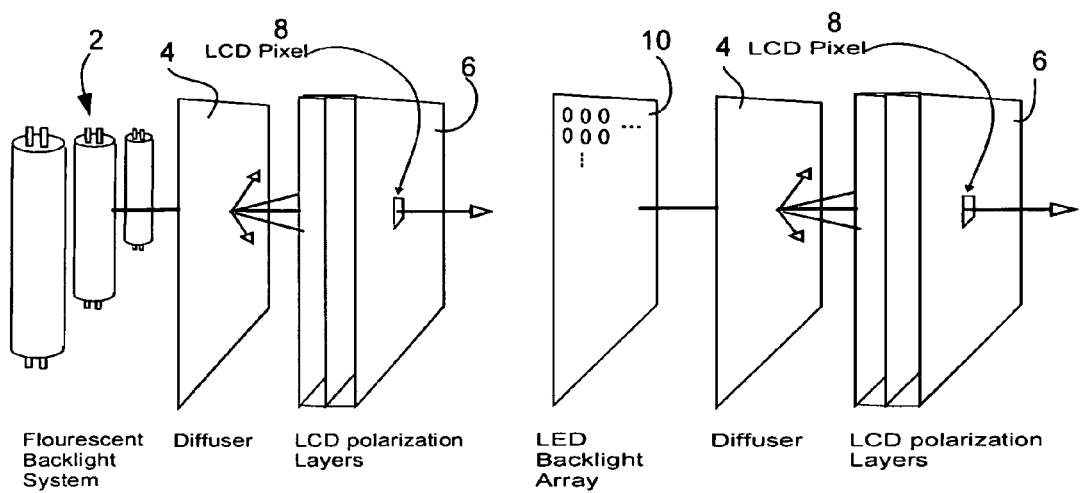
FIG. 1 is a diagram showing prior art backlit LCD systems.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Display devices using light valve modulators, such as LC modulators and other modulators may be reflective, wherein light is radiated onto the front surface (facing a viewer) and reflected back toward the viewer after passing through the modulation panel layer. Display devices may also be transmissive, wherein light is radiated onto the back of the modulation panel layer and allowed to pass through the modulation layer toward the viewer. Some display devices may also be transflexive, a combination of reflective and transmissive, wherein light may pass through the modulation layer from back to front while light from another source is reflected after entering from the front of the modulation layer. In any of these cases, the elements in the modulation layer, such as the individual LC elements, may control the perceived brightness of a pixel.

In backlit, front-lit and side-lit displays, the light source may be a series of fluorescent tubes, an LED array or some other source. Once the display is larger than a typical size of about 18", the majority of the power consumption for the device is due to the light source. For certain applications, and in certain markets, a reduction in power consumption is important. However, a reduction in power means a reduction in the light flux of the light source, and thus a reduction in the maximum brightness of the display.

A basic equation relating the current gamma-corrected light valve modulator's gray-level code values, CV, light source level, $L_{source}$, and output light level, $L_{out}$, is:

$$L_{out}=L_{source}*g(CV+\text{dark})^\gamma+\text{ambient} \quad (1)$$

Where g is a calibration gain, dark is the light valve's dark level, and ambient is the light hitting the display from the room conditions. From this equation, it can be seen that reducing the backlight light source by x % also reduces the light output by x %.

The reduction in the light source level can be compensated by changing the light valve's modulation values; in particular, boosting them. In fact, any light level less than (1−x %) can be reproduced exactly while any light level above (1−x %) cannot be reproduced without an additional light source or an increase in source intensity.

Similarly, an image's brightness can be increased or decreased with a constant light source luminance level by adjusting the light valve modulation values. In multiple-view displays that have a common light source, the brightness of a single view can be adjusted by light valve modulation value adjustment.

In the exemplary case of a reduced light source level, setting the light output from the original and reduced sources gives a basic code value correction that may be used to correct code values for an x % reduction (assuming dark and ambient are 0). This may be expressed mathematically as:

$$L_{out}=L_{source}*g(CV)^\gamma=L_{reduced}*g(CV_{boost})^\gamma \quad (2)$$

$$CV_{boost}=CV*(L_{source}/L_{reduced})^{1/\gamma}=CV*(1/x\%)^{1/\gamma} \quad (3)$$

Figure 2A:
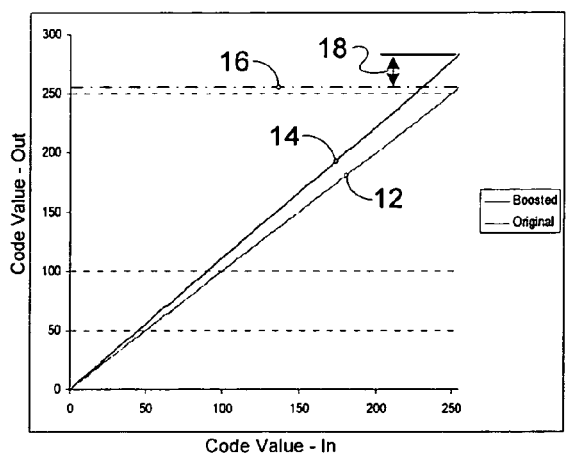
FIG. 2A is a chart showing the relationship between original image code values and boosted image code values.
Figure 2B:
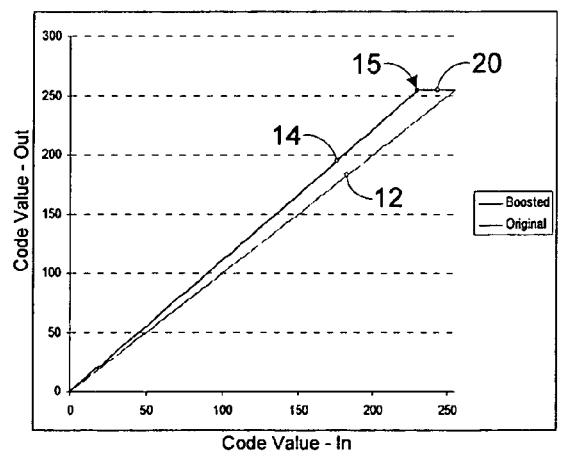
FIG. 2B is a chart showing the relationship between original image code values and boosted image code values with clipping.

FIG. 2A illustrates this adjustment. In FIGS. 2A and 2B, the original display values correspond to points along line 12.

When the backlight or light source is placed in power-save mode and/or the light source illumination is reduced, the display code values need to be boosted to allow the light valves to counteract the reduction in light source illumination. These same light valve code values may be boosted to increase image brightness and/or contrast independent of the light source (backlight) level. These boosted values coincide with points along line 14. However, this adjustment results in code values 18 higher than the display is capable of producing (e.g., 255 for an 8 bit display). Consequently, these values end up being clipped 20 as illustrated in FIG. 2B. Images adjusted in this way may suffer from washed out highlights, an artificial look, and generally low quality.

Using this simple adjustment model, code values below the clipping point 15 (input code value 230 in this exemplary embodiment) will be displayed at a luminance level equal to the level produced with a full power light source while in a reduced source light illumination mode. The same luminance is produced with a lower power resulting in power savings. If the set of code values of an image are confined to the range below the clipping point 15 the power savings mode can be operated transparently to the user.

Similarly, when the light source level is constant and the light valve values are boosted to increase brightness or other characteristics, clipping will occur for those values that are boosted above the maximum value acceptable to the light valve.

Unfortunately, when values exceed the clipping point 15, luminance is reduced and detail is lost. Embodiments of the present invention provide an algorithm that can alter the LCD or light valve code values to provide increased brightness (or a lack of brightness reduction in power save mode) while reducing clipping artifacts that may occur at the high end of the luminance range.

Some embodiments of the present invention may eliminate the reduction in brightness associated with reducing display light source power by matching the image luminance displayed with low power to that displayed with full power for a significant range of values. In these embodiments, the reduction in source light or backlight power which divides the output luminance by a specific factor is compensated for by a boost in the image data by a reciprocal factor.

Ignoring dynamic range constraints, the images displayed under full power and reduced power may be identical because the division (for reduced light source illumination) and multiplication (for boosted code values) essentially cancel across a significant range. Dynamic range limits may cause clipping artifacts whenever the multiplication (for code value boost) of the image data exceeds the maximum of the display. Clipping artifacts caused by dynamic range constraints may be eliminated or reduced by rolling off the boost at the upper end of code values. This roll-off may start at a function transition point (FTP), above which the luminance is no longer matched to the original luminance or above which the boosted luminance function changes to a different function for the purpose of avoiding clipping artifacts.

In some embodiments of the present invention, the following steps may be executed to compensate for a light source illumination reduction or a virtual light source reduction (code value boost) for image enhancement:

1) A source light (backlight) reduction level is determined in terms of a percentage of luminance reduction;
2) A Function Transition Point (FTP) is determined at which a roll-off from matching reduced-power output to full-power output occurs or at which the boost function changes to avoid clipping artifacts;

3) Determine a compensating tone scale operator;
   a. Below the FTP, boost the tone scale to compensate for a reduction in display luminance or to enhance brightness, etc. of the image;
   b. Above the FTP, roll off the tone scale gradually (in some embodiments, keeping continuous derivatives);
4) Apply tone scale mapping operator to image; and
5) Send to the display.

The primary advantage of these light-source-reduction compensation embodiments is that power savings can be achieved with only small changes to a narrow category of images. (Differences only occur above the FTP and consist of a reduction in peak brightness and some loss of bright detail). Image values below the FTP can be displayed in the power savings mode with the same luminance as the full power mode making these areas of an image indistinguishable from the full power mode.

In embodiments that provide light-source-independent brightness adjustment, as in multiple-view display embodiments, the brightness of the image may be increased uniformly (if desired) over a wide range of values up to the FTP. Values above the FTP are typically boosted by an increasingly smaller amount as the values increase to the maximum, at which point no increase is achievable.

Some embodiments of the present invention may use a tone scale map that is dependent upon the power reduction or brightness boost and display gamma, and which is independent of image data. These embodiments may provide two advantages. Firstly, flicker artifacts which may arise due to processing frames differently do not arise, and, secondly, the algorithm may have a very low implementation complexity. In some embodiments, an off-line tone scale design and on-line tone scale mapping may be used. Clipping in highlights may be controlled by the specification of the FTP and the function(s) used above the FTP.

Figure 3:
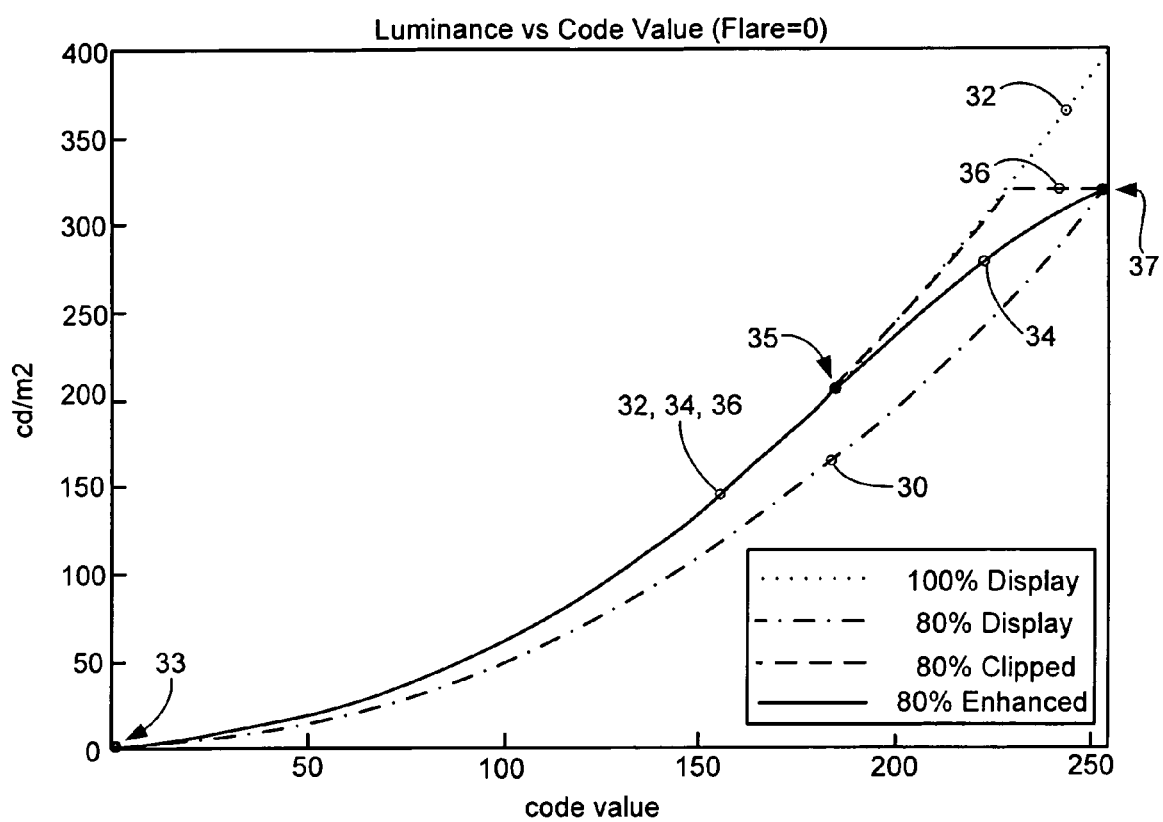
FIG. 3 is a chart showing the luminance level associated with code values for various code value modification schemes.

Some aspects of light-source-reduction compensation embodiments of the present invention may be described in relation to FIG. 3. FIG. 3 is a graph showing image code values plotted against luminance for several situations. A first curve 32, shown as dotted, may represent the original code values for a light source operating at 100% power. A second curve 30, shown as a dash-dot curve, represents the luminance of the original code values when the light source operates at 80% of full power. A third curve 36, shown as a dashed curve, represents the luminance when code values are boosted to match the luminance provided at 100% light source illumination while the light source operates at 80% of full power. A fourth curve 34, shown as a solid line, represents the boosted data, but with a roll-off curve to reduce the effects of clipping at the high end of the data.

In this exemplary embodiment, shown in FIG. 3, an FTP 35 at code value 180 was used. Note that below code value 180, the boosted curve 34 matches the luminance output 32 by the original 100% power display. Above 180, the boosted curve smoothly transitions to the maximum output allowed on the 80% display. This smoothness reduces clipping and quantization artifacts. In some embodiments, the tone scale function may be defined piecewise to match smoothly at the transition point given by the FTP 35. Below the FTP 35, the boosted tone scale function may be used. Above the FTP 35, a curve is fit smoothly to the end point of boosted tone scale curve at the FTP and fit to the end point 37 at the maximum code value [255]. In some embodiments, the slope of the curve may be matched to the slope of the boosted tone scale curve/line at the FTP 35. This may be achieved by matching the slope of the line below the FTP to the slope of the curve above the FTP by equating the derivatives of the line and curve functions at the FTP and by matching the values of the line and curve functions at that point. Another constraint on the curve function may be that it be forced to pass through the maximum value point [255,255] 37. In some embodiments the slope of the curve may be set to 0 at the maximum value point 37. In some embodiments, an FTP value of 180 may correspond to a light source power reduction of 20%.

In some embodiments of the present invention, the tone scale curve may be defined by a linear relation with gain, g, below the Function Transition Point (FTP). The tone scale may be further defined above the FTP so that the curve and its first derivative are continuous at the FTP. This continuity implies the following form on the tone scale function:

$$y = \begin{cases} g \cdot x & x < FTP \\ C + B \cdot (x - FTP) + A \cdot (x - FTP)^2 & x \geq FTP \end{cases}$$

$$C = g \cdot FTP$$

$$B = g$$

$$A = \frac{Max - (C + B \cdot (Max - FTP))}{(Max - FTP)^2}$$

$$A = \frac{Max - g \cdot Max}{(Max - FTP)^2}$$

$$A = \frac{Max \cdot (1 - g)}{(Max - FTP)^2}$$

$$y = \begin{cases} g \cdot x & x < FTP \\ g \cdot x + Max \cdot (1 - g) \cdot \left(\frac{x - FTP}{Max - FTP}\right)^2 & x \geq FTP \end{cases}$$

The gain may be determined by display gamma and brightness reduction ratio as follows:

$$g = \left(\frac{FullPower}{ReducedPower}\right)^{\frac{1}{\gamma}}$$

In some embodiments, the FTP value may be tuned by balancing highlight detail preservation with absolute brightness preservation.

The FTP can be determined by imposing the constraint that the slope be zero at the maximum point. This implies:

$$slope = \begin{cases} g & x < FTP \\ g + 2 \cdot Max \cdot (1 - g) \cdot \frac{x - FTP}{(Max - FTP)^2} & x \geq FTP \end{cases}$$

$$slope(Max) = g + 2 \cdot Max \cdot (1 - g) \cdot \frac{Max - FTP}{(Max - FTP)^2}$$

$$slope(Max) = g + \frac{2 \cdot Max \cdot (1 - g)}{Max - FTP}$$

$$slope(Max) = \frac{g \cdot (Max - FTP) + 2 \cdot Max \cdot (1 - g)}{Max - FTP}$$

$$slope(Max) = \frac{2 \cdot Max - g \cdot (Max + FTP)}{Max - FTP}$$

In some exemplary embodiments, the following equations may be used to calculate the code values for simple boosted data, boosted data with clipping and corrected data, respectively, according to an exemplary embodiment.

$$ToneScale_{boost}(cv) = (1/x)^{1/\gamma} \cdot cv$$

$$ToneScale_{clipped}(cv) = \begin{cases} (1/x)^{1/\gamma} \cdot cv & cv \le 255 \cdot (x)^{1/\gamma} \\ 255 & \text{otherwise} \end{cases}$$

$$ToneScale_{corrected}(cv) = \begin{cases} (1/x)^{1/\gamma} \cdot cv & cv \le FTP \\ A \cdot cv^2 + B \cdot cv + C & \text{otherwise} \end{cases}$$

The constants A, B, and C may be chosen to give a smooth fit at the FTP and so that the curve passes through the point [255,255]. Plots of these functions are shown in FIG. 4.

Figure 4:
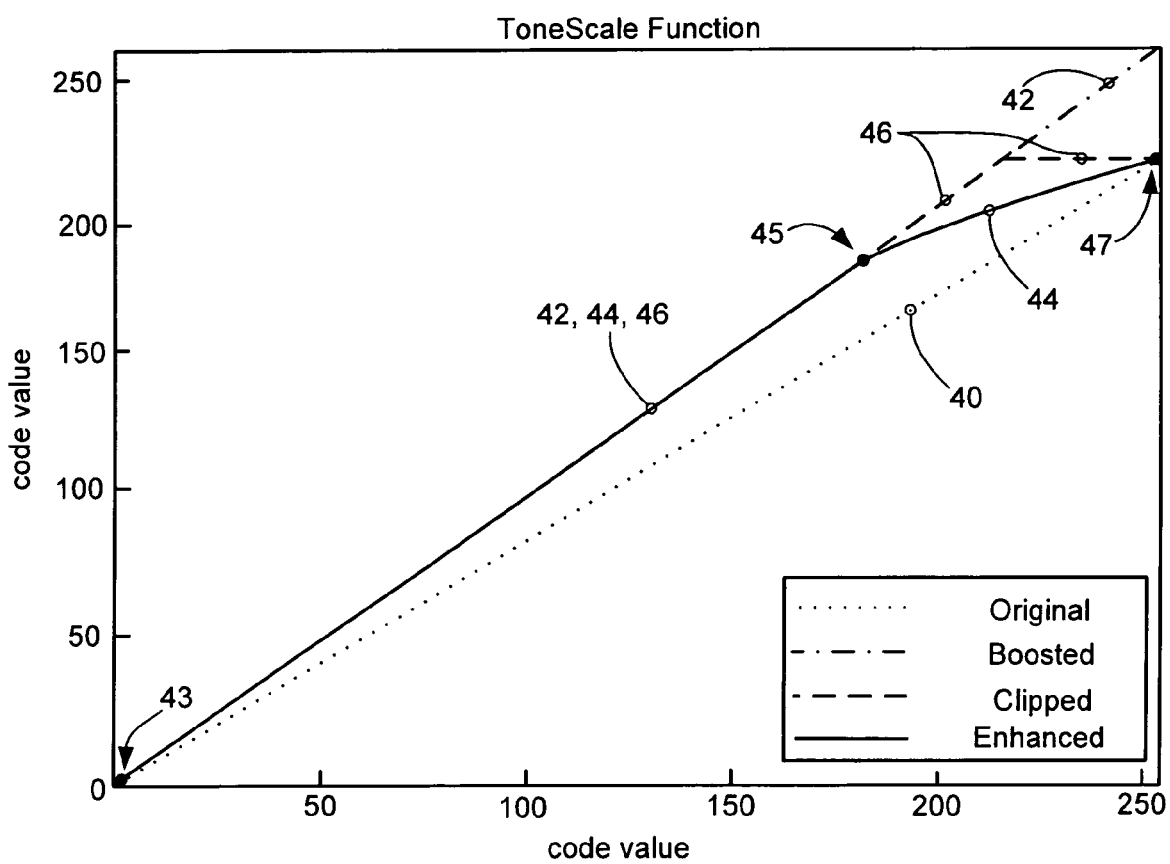
FIG. 4 is a chart showing the relationship between original image code values and modified image code values according to various modification schemes.

FIG. 4 is a plot of original code values vs. adjusted code values. Original code values are shown as points along original data line 40, which shows a 1:1 relationship between adjusted and original values as these values are original (without adjustment). According to embodiments of the present invention, these values may be boosted or adjusted to represent higher luminance levels (increased brightness). A simple boost procedure according to the "tonescale boost" equation above, may result in values along boost line 42 (dash-dot line). Since display of these values will result in clipping, as shown graphically at line 46 and mathematically in the "tonescale clipped" equation above, the adjustment may taper off from a function transition point 45 along curve 44 to the maximum value point 47. In some embodiments, this relationship may be described mathematically in the "tonescale corrected" equation above.

Using these concepts, luminance values represented by the display with a light source operating at 100% power may be represented by the display with a light source operating at a lower power level. This is achieved through a boost of the tone scale, which essentially opens the light valves further to compensate for the loss of light source illumination. Likewise, the brightness of a displayed image can be adjusted by boosting or lowering the code values for that image. However, a simple application of this boosting across the entire code value range results in clipping artifacts at the high end of the range. To prevent or reduce these artifacts, the tone scale function may be rolled-off smoothly. This roll-off may be controlled by the FTP parameter. Large values of FTP give luminance matches over a wide interval but increase the visible quantization/clipping artifacts at the high end of code values.

Embodiments of the present invention may operate by adjusting code values. In a simple gamma display model, the scaling of code values gives a scaling of luminance values, with a different scale factor. To determine whether this relation holds under more realistic display models, we may consider the Gamma Offset Gain-Flair (GOG-F) model. Scaling the backlight power corresponds to linear reduced equations where a percentage, p, is applied to the output of the display, not the ambient. It has been observed that reducing the gain by a factor p is equivalent to leaving the gain unmodified and scaling the data, code values and offset, by a factor determined by the display gamma. Mathematically, the multiplicative factor can be pulled into the power function if suitably modified. This modified factor may scale both the code values and the offset.

$$L = G \cdot (CV + \text{dark})^\gamma + \text{ambient} \quad \text{Equation 1 GOG-F model}$$

$$L_{Linear\,reduced} = p \cdot G \cdot (CV + \text{dark})^\gamma + \text{ambient}$$

$$L_{Linear\,reduced} = G \cdot (p^{1/\gamma} \cdot (CV + \text{dark}))^\gamma + \text{ambient}$$

$$L_{Linear\,reduced} = G \cdot (p^{1/\gamma} \cdot CV + p^{1/\gamma} \cdot \text{dark})^\gamma + \text{ambient} \quad \text{Equation 2 Linear Luminance Reduction}$$

$$L_{CV\,reduced} = G \cdot (p^{1/\gamma} \cdot CV + \text{dark})^\gamma + \text{ambient} \quad \text{Equation 3 Code Value Reduction}$$

Figure 5:
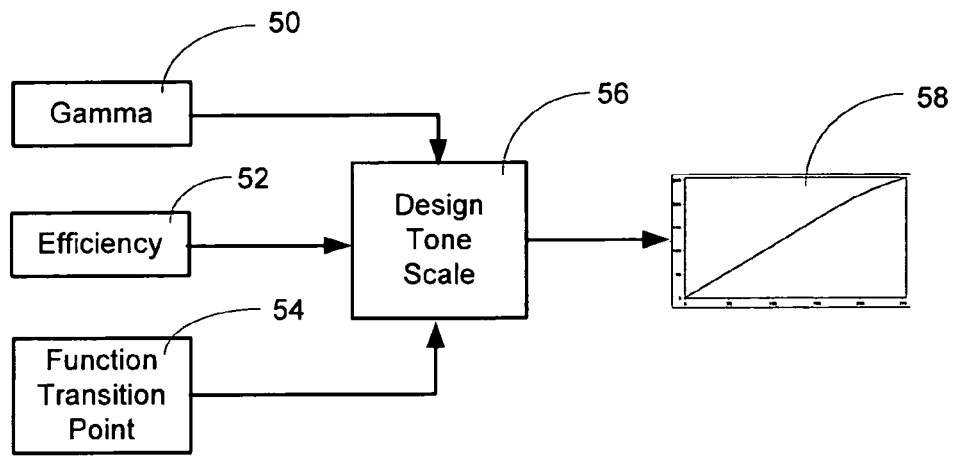
FIG. 5 is a diagram showing the generation of an exemplary tone scale adjustment model.

Some embodiments of the present invention may be described with reference to FIG. 5. In these embodiments, a tone scale adjustment may be designed or calculated off-line, prior to image processing, or the adjustment may be designed or calculated on-line as the image is being processed. Regardless of the timing of the operation, the tone scale adjustment 56 may be designed or calculated based on at least one of a display gamma 50, an efficiency factor 52 and a Function Transition Point (FTP) 54. These factors may be processed in the tone scale design process 56 to produce a tone scale adjustment model 58. The tone scale adjustment model may take the form of an algorithm, a look-up table (LUT) or some other model that may be applied to image data.

Figure 6:
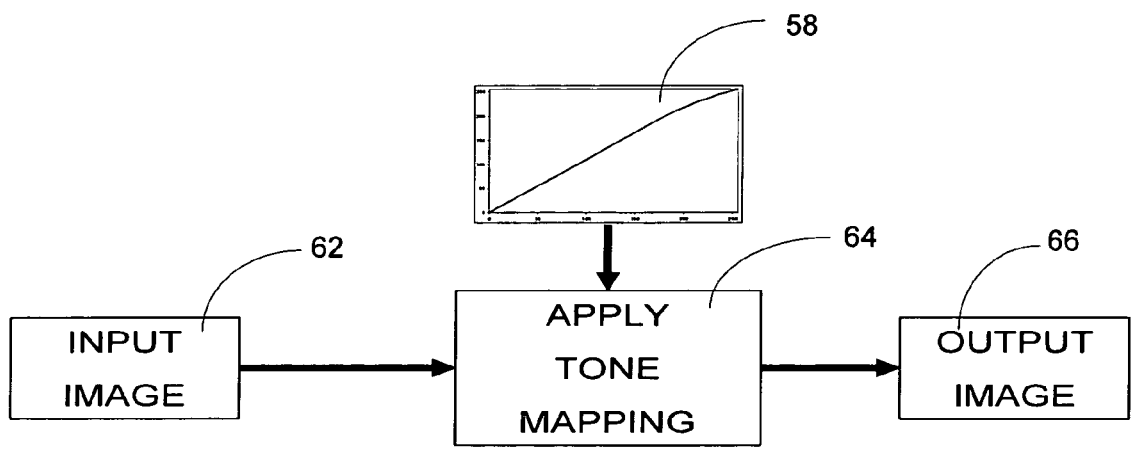
FIG. 6 is a diagram showing an exemplary application of a tone scale adjustment model.

Once the adjustment model 58 has been created, it may be applied to the image data. The application of the adjustment model may be described with reference to FIG. 6. In these embodiments, an image is input 62 and the tone scale adjustment model 58 is applied 64 to the image to adjust the image code values. This process results in an output image 66 that may be sent to a display. Application 64 of the tone scale adjustment is typically an on-line process, but may be performed in advance of image display when conditions allow.

Some embodiments of the present invention comprise systems and methods for enhancing images (e.g., brightness and contrast enhancement) displayed on displays using light-emitting pixel modulators, such as LED displays, plasma displays and other types of displays. These same systems and methods may be used to enhance images displayed on displays using light-valve pixel modulators with light sources operating in full power mode or otherwise.

These embodiments work similarly to the previously-described embodiments, however, rather than compensating for a reduced light source illumination, these embodiments simply increase the luminance of a range of pixels as if the light source had been reduced. In this manner, the overall brightness of the image is improved.

In these embodiments, the original code values are boosted across a significant range of values. This code value adjustment may be carried out as explained above for other embodiments, except that no actual light-source-illumination reduction occurs. Therefore, the image brightness is increased significantly over a wide range of code values.

Some of these embodiments may be explained with reference to FIG. 3 as well. In these embodiments, code values for an original image are shown as points along curve 30. These values may be boosted or adjusted to values with a higher luminance level. These boosted values may be represented as points along curve 34, which extends from the zero point 33 to the maximum fidelity point 35 and then tapers off to the maximum value point 37.

Some embodiments of the present invention comprise an unsharp masking process. In some of these embodiments the unsharp masking may use a spatially varying gain. This gain may be determined by the image value and the slope of the modified tone scale curve. In some embodiments, the use of a gain array enables matching the image contrast even when the image brightness cannot be duplicated due to limitations on the display power.

Some embodiments of the present invention may take the following process steps:
1. Compute a tone scale adjustment model;
2. Compute a High Pass image;
3. Compute a Gain array;
4. Weight High Pass Image by Gain;

5. Sum Low Pass Image and Weighted High Pass Image; and
6. Send to the display

Other embodiments of the present invention may take the following process steps:
1. Compute a tone scale adjustment model;
2. Compute Low Pass image;
3. Compute High Pass image as difference between Image and Low Pass image;
4. Compute Gain array using image value and slope of modified Tone Scale Curve;
5. Weight High Pass Image by Gain;
6. Sum Low Pass Image and Weighted High Pass Image; and
7. Send to the display.

Using some embodiments of the present invention, power savings can be achieved with only small changes on a narrow category of images. (Differences only occur above the FTP and consist of a reduction in peak brightness and some loss of bright detail). Image values below the FTP can be displayed in the power savings mode with the same luminance as the full power mode making these areas of an image indistinguishable from the full power mode. Other embodiments of the present invention improve this performance by reducing the loss of bright detail.

These embodiments may comprise spatially varying unsharp masking to preserve bright detail. As with other embodiments, both an on-line and an off-line component may be used. In some embodiments, an off-line component may be extended by computing a gain map in addition to the Tone Scale function. The gain map may specify an unsharp filter gain to apply based on an image value. A gain map value may be determined using the slope of the Tone Scale function. In some embodiments, the gain map value at a particular point "P" may be calculated as the ratio of the slope of the Tone Scale function below the FTP to the slope of the Tone Scale function at point "P." In some embodiments, the Tone Scale function is linear below the FTP, therefore, the gain is unity below the FTP.

Figure 7:
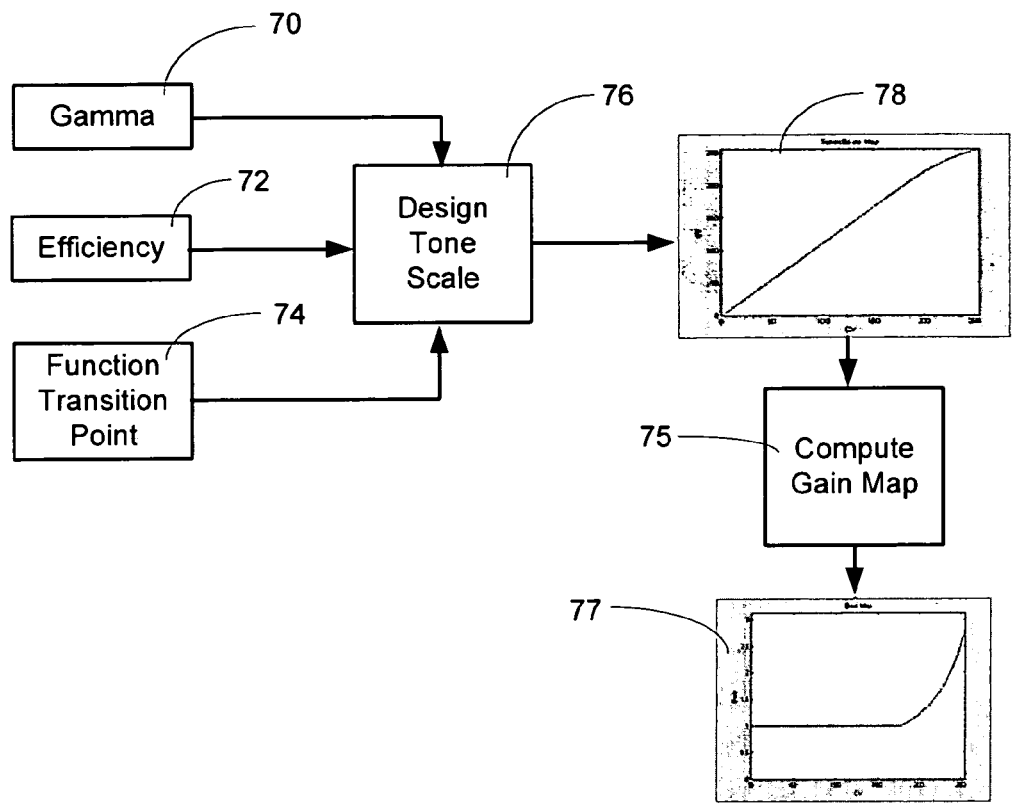
FIG. 7 is a diagram showing the generation of an exemplary tone scale adjustment model and gain map.

Some embodiments of the present invention may be described with reference to FIG. 7. In these embodiments, a tone scale adjustment may be designed or calculated off-line, prior to image processing, or the adjustment may be designed or calculated on-line as the image is being processed. Regardless of the timing of the operation, the tone scale adjustment 76 may be designed or calculated based on at least one of a display gamma 70, an efficiency factor 72 and a Function Transition Point (FTP) 74. These factors may be processed in the tone scale design process 76 to produce a tone scale adjustment model 78. The tone scale adjustment model may take the form of an algorithm, a look-up table (LUT) or some other model that may be applied to image data as described in relation to other embodiments above. In these embodiments, a separate gain map 77 may also be computed 75. This gain map 77 may be applied to specific image subdivisions, such as frequency ranges. In some embodiments, the gain map may be applied to frequency-divided portions of an image. In some embodiments, the gain map may be applied to a high-pass image subdivision. It may also be applied to specific image frequency ranges or other image subdivisions.

Figure 8:
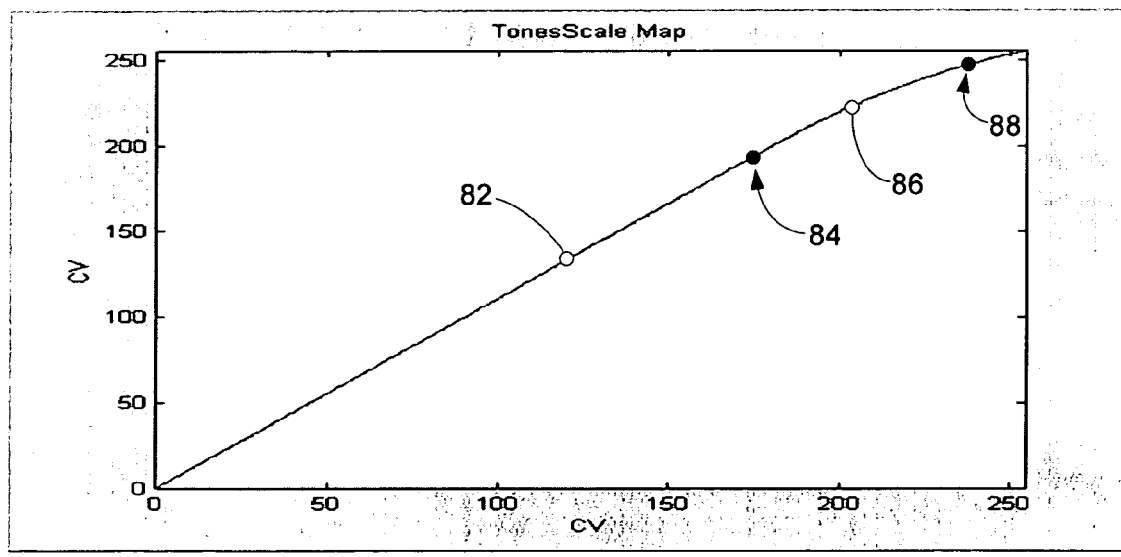
FIG. 8 is a chart showing an exemplary tone scale adjustment model.

An exemplary tone scale adjustment model may be described in relation to FIG. 8. In these exemplary embodiments, a Function Transition Point (FTP) 84 is selected and a gain function is selected to provide a first gain relationship 82 for values below the FTP 84. In some embodiments, the first gain relationship may be a linear relationship, but other relationships and functions may be used to convert code values to enhanced code values. Above the FTP 84, a second gain relationship 86 may be used. This second gain relationship 86 may be a function that joins the FTP 84 with a maximum value point 88. In some embodiments, the second gain relationship 86 may match the value and slope of the first gain relationship 82 at the FTP 84 and pass through the maximum value point 88. Other relationships, as described above in relation to other embodiments, and still other relationships may also serve as a second gain relationship 86.

In some embodiments, a gain map 77 may be calculated in relation to the tone scale adjustment model, as shown in FIG. 8. An exemplary gain map 77, may be described in relation to FIG. 9. In these embodiments, a gain map function relates to the tone scale adjustment model 78 as a function of the slope of the tone scale adjustment model. In some embodiments, the value of the gain map function at a specific code value is determined by the ratio of the slope of the tone scale adjustment model at any code value below the FTP to the slope of the tone scale adjustment model at that specific code value. In some embodiments, this relationship may be expressed mathematically in the following equation:

$$\text{Gain}(cv) = \frac{\text{ToneScaleSlope}(1)}{\text{ToneScaleSlope}(cv)}$$

In these embodiments, the gain map function is equal to one below the FTP where the tone scale adjustment model results in a linear boost. For code values above the FTP, the gain map function increases quickly as the slope of the tone scale adjustment model tapers off. This sharp increase in the gain map function enhances the contrast of the image portions to which it is applied.

Figure 9:
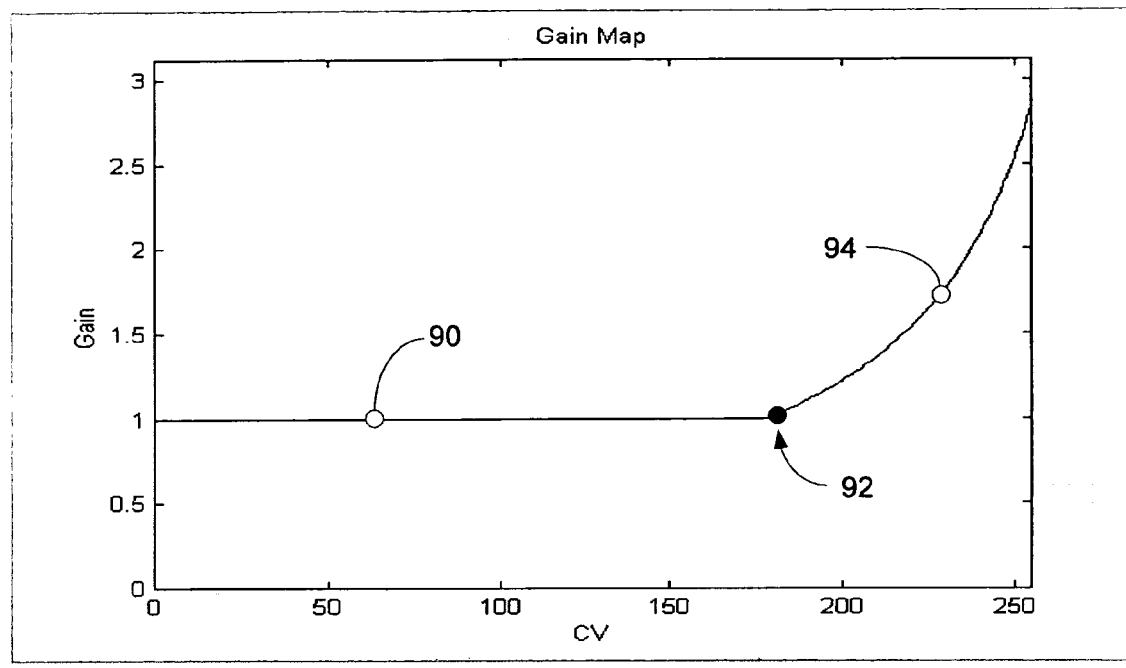
FIG. 9 is a chart showing an exemplary gain map.

The exemplary tone scale adjustment factor illustrated in FIG. 8 and the exemplary gain map function illustrated in FIG. 9 were calculated using a display percentage (source light reduction) of 80%, a display gamma of 2.2 and a Function Transition Point of 180 for light-source-reduction compensation embodiments.

In some embodiments of the present invention, an unsharp masking operation may be applied following the application of the tone scale adjustment model. In these embodiments, artifacts are reduced with the unsharp masking technique.

Figure 10:
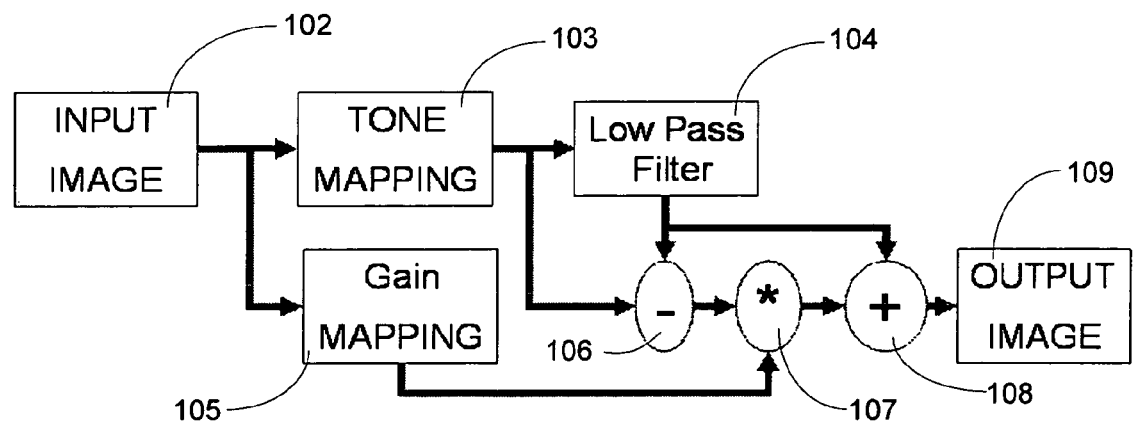
FIG. 10 is a flow chart showing an exemplary process wherein a tone scale adjustment model and gain map are applied to an image.

Some embodiments of the present invention may be described in relation to FIG. 10. In these embodiments, an original image 102 is input and a tone scale adjustment model 103 is applied to the image. The original image 102 is also used as input to a gain mapping process 105 which results in a gain map. The tone scale adjusted image is then processed through a low pass filter 104 resulting in a low-pass adjusted image. The low pass adjusted image is then subtracted 106 from the tone scale adjusted image to yield a high-pass adjusted image. This high-pass adjusted image is then multiplied 107 by the appropriate value in the gain map to provide a gain-adjusted high-pass image which is then added 108 to the low-pass adjusted image, which has already been adjusted with the tone scale adjustment model. This addition results in an output image 109 with increased brightness and improved high-frequency contrast.

In some of these embodiments, for each component of each pixel of the image, a gain value is determined from the Gain map and the image value at that pixel or sub-pixel. The original image 102, prior to application of the tone scale adjustment model, may be used to determine the Gain. Each component of each pixel of the high-pass image may also be scaled by the corresponding gain value before being added back to the low pass image. At points where the gain map function is one, the unsharp masking operation may not modify the image values. At points where the gain map function exceeds one, the contrast may be increased.

Some embodiments of the present invention address the loss of contrast in high-end code values, when increasing code value brightness, by decomposing an image into multiple frequency bands. In some embodiments, a Tone Scale Function may be applied to a low-pass band increasing the brightness of the image data to compensate for source-light luminance reduction on a low power setting or simply to increase the brightness of a displayed image. In parallel, a constant gain may be applied to a high-pass band preserving the image contrast even in areas where the mean absolute brightness is reduced due to the lower display power. The operation of an exemplary algorithm is given by:

1. Perform frequency decomposition of original image
2. Apply brightness preservation, Tone Scale Map, to a Low Pass Image
3. Apply constant multiplier to High Pass Image
4. Sum Low Pass and High Pass Images
5. Send result to the display The Tone Scale Function and the constant gain may be determined off-line by creating a photometric match between the full power display of the original image and the low power display of the process image for source-light-illumination reduction applications. The Tone Scale Function may also be determined off-line for brightness enhancement applications.

For modest FTP values, these constant-high-pass gain embodiments and the unsharp masking embodiments can be nearly indistinguishable in their performance. These constant-high-pass gain embodiments have three main advantages compared to the unsharp masking embodiments: reduced noise sensitivity, ability to use larger FTPs and use of processing steps currently in the display system. The unsharp masking embodiments may use a gain which is the inverse of the slope of the Tone Scale Curve. When the slope of this curve is small, this gain incurs a large amplifying noise. This noise amplification may also place a practical limit on the size of the FTP. The second advantage is the ability to extend to arbitrary FTP values. The third advantage comes from examining the placement of the algorithm within a system. Both the constant-high-pass gain embodiments and the unsharp masking embodiments use frequency decomposition. The constant-high-pass gain embodiments perform this operation first while some unsharp masking embodiments first apply a Tone Scale Function before the frequency decomposition. Some system processing such as de-contouring will perform frequency decomposition prior to the brightness preservation algorithm. In these cases, that frequency decomposition can be used by some constant-high-pass embodiments thereby eliminating a conversion step while some unsharp masking embodiments must invert the frequency decomposition, apply the Tone Scale Function and perform additional frequency decomposition.

Some embodiments of the present invention prevent the loss of contrast in high-end code values by splitting the image based on spatial frequency prior to application of the tone scale function. In these embodiments, the tone scale function with roll-off may be applied to the low pass (LP) component of the image. In light-source-illumination reduction compensation applications, this will provide an overall luminance match of the low pass image components. In these embodiments, the high pass (HP) component is uniformly boosted (constant gain). The frequency-decomposed signals may be recombined and clipped as needed. Detail is preserved since the high pass component is not passed through the roll-off of the tone scale function. The smooth roll-off of the low pass tone scale function preserves head room for adding the boosted high pass contrast. Clipping that may occur in this final combination has not been found to reduce detail significantly.

Figure 11:
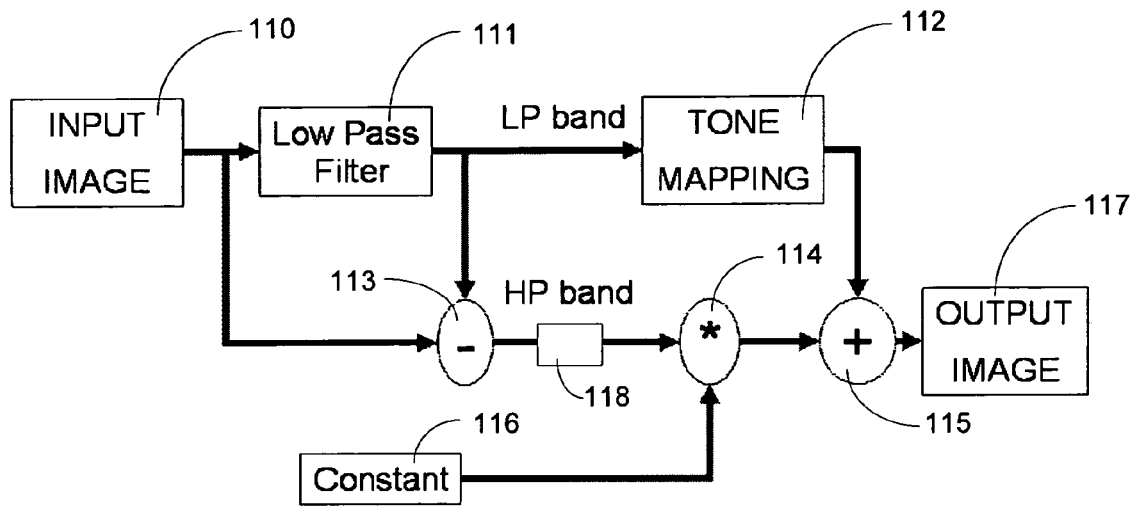
FIG. 11 is a flow chart showing an exemplary process wherein a tone scale adjustment model is applied to one frequency band of an image and a gain map is applied to another frequency band of the image.

Some embodiments of the present invention may be described with reference to FIG. 11. These embodiments comprise frequency splitting or decomposition 111, low-pass tone scale mapping 112, constant high-pass gain or boost 116 and summation or re-combination 115 of the enhanced image components.

In these embodiments, an input image 110 is decomposed into spatial frequency bands 111. In an exemplary embodiment, in which two bands are used, this may be performed using a low-pass (LP) filter 111. The frequency division is performed by computing the LP signal via a filter 111 and subtracting 113 the LP signal from the original to form a high-pass (HP) signal 118. In an exemplary embodiment, a spatial 5×5 rect filter may be used for this decomposition though another filter may be used.

The LP signal may then be processed by application of tone scale mapping as discussed for previously described embodiments. In an exemplary embodiment, this may be achieved with a Photometric matching LUT. In these embodiments, a higher value of FTP can be used compared to some previously described unsharp masking embodiments since most detail has already been extracted in filtering 111. Clipping should not generally be used since some head room should typically be preserved in which to add contrast.

Figure 12:
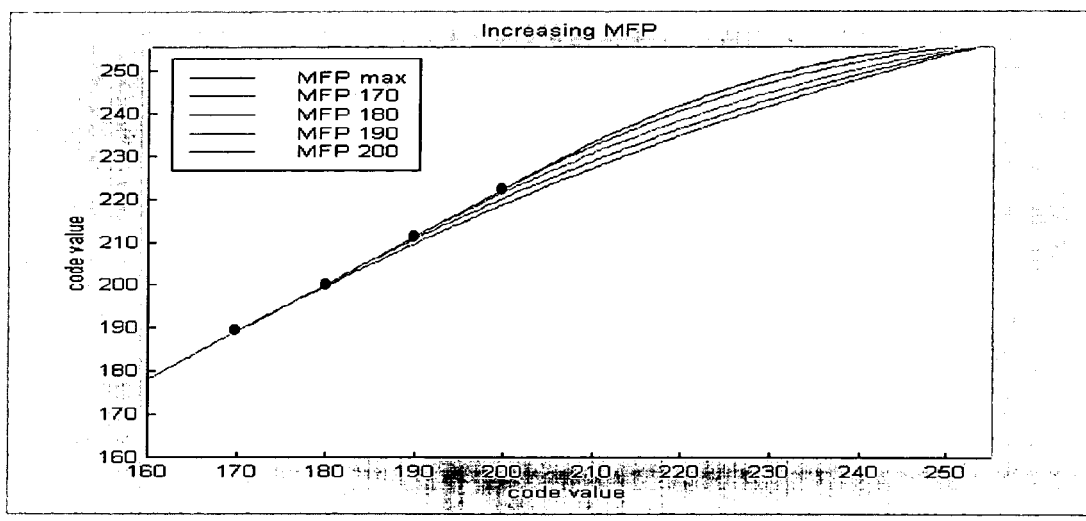
FIG. 12 is a chart showing tone scale adjustment model variations as the FTP changes.

In some embodiments, the FTP may be determined automatically and may be set so that the slope of the Tone Scale Curve is zero at the upper limit. A series of tone scale functions determined in this manner are illustrated in FIG. 12. In these embodiments, the maximum value of FTP may be determined such that the tone scale function has slope zero at 255. This is the largest FTP value that does not cause clipping.

In some embodiments of the present invention, described with reference to FIG. 11, processing the HP signal 118 is independent of the choice of FTP used in processing the low pass signal. The HP signal 118 is processed with a constant gain 116 which will preserve the contrast when the power/light-source illumination is reduced or when the image code values are otherwise boosted to improve brightness. The formula for the HP signal gain 116 in terms of the full and reduced backlight powers (BL) and display gamma is given immediately below as a high pass gain equation. The HP contrast boost is robust against noise since the gain is typically small (e.g. gain is 1.1 for 80% power reduction and gamma 2.2).

$$HighPassGain = \left(\frac{BL_{Full}}{BL_{Reduced}}\right)^{1/\gamma}$$

In some embodiments, once the tone scale mapping 112 has been applied to the LP signal, through LUT processing or otherwise, and the constant gain 116 has been applied to the HP signal, these frequency components may be summed 115 and, in some cases, clipped. Clipping may be necessary when the boosted HP value added to the LP value exceeds 255. This will typically only be relevant for bright signals with high contrast. In some embodiments, the LP signal is guaranteed not to exceed the upper limit by the tone scale LUT construction. The HP signal may cause clipping in the sum, but the negative values of the HP signal will never clip maintaining some contrast even when clipping does occur.

Figure 13:
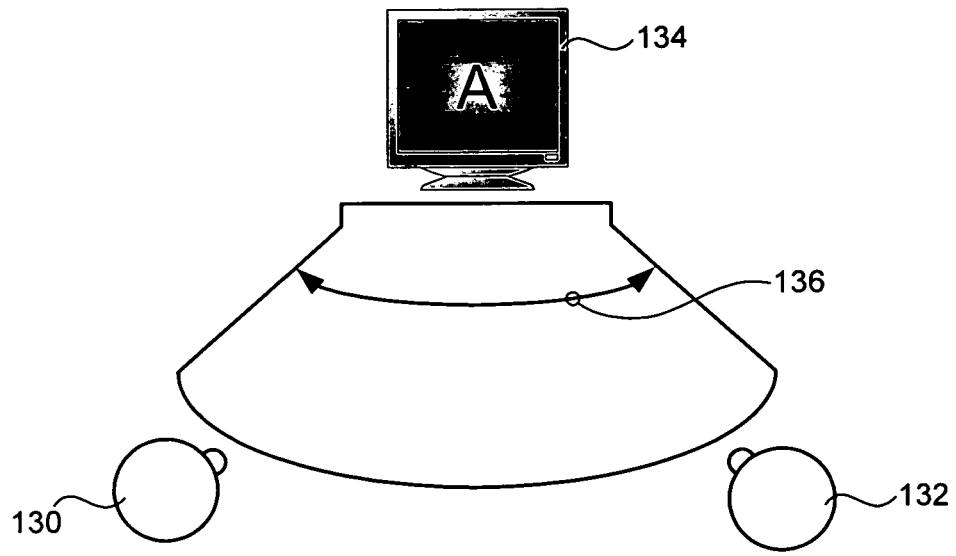
FIG. 13 is a chart showing the view of a prior art single-view display.

Some embodiments of the present invention may be used with multiple-view displays to enhance one view of the display independently of the other view. A simple single-view display 134, illustrated in FIG. 13, displays a single image to all viewers within its single, undivided viewing area 136. A viewer 130 to the left side of the display sees the same image as a viewer 132 on the right side of the display. In single-view displays, the source light (e.g., backlight) can be used to control the brightness of the single view.

Figure 14:
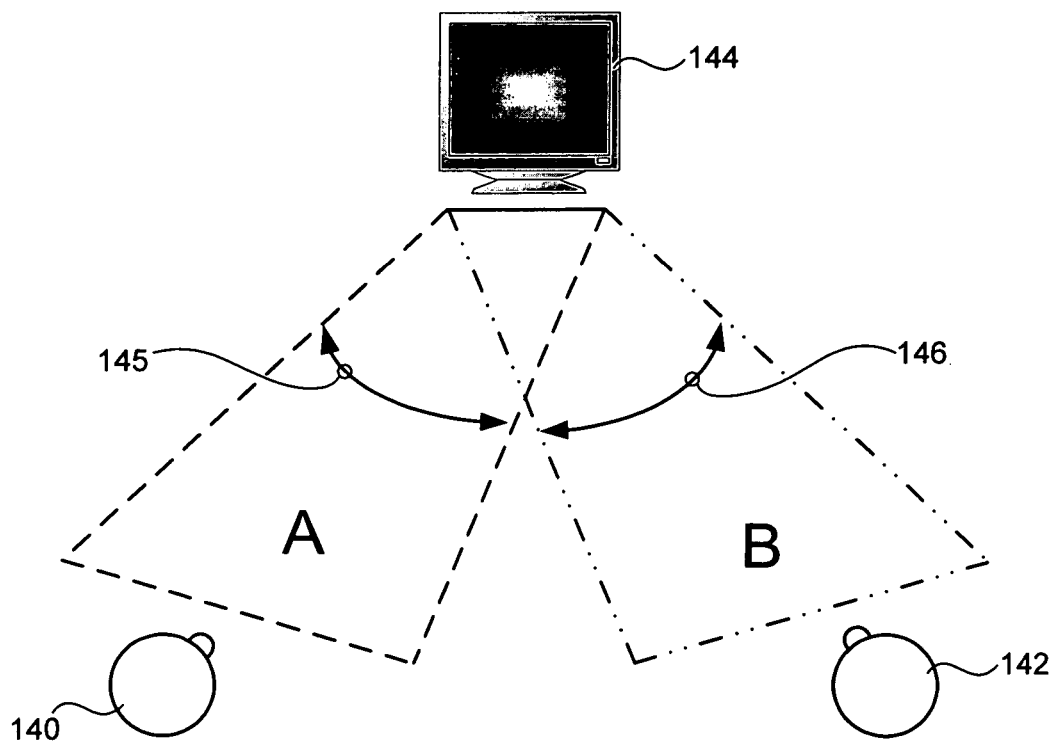
FIG. 14 is a chart showing multiple views of a multiple-view display.
Figure 15:
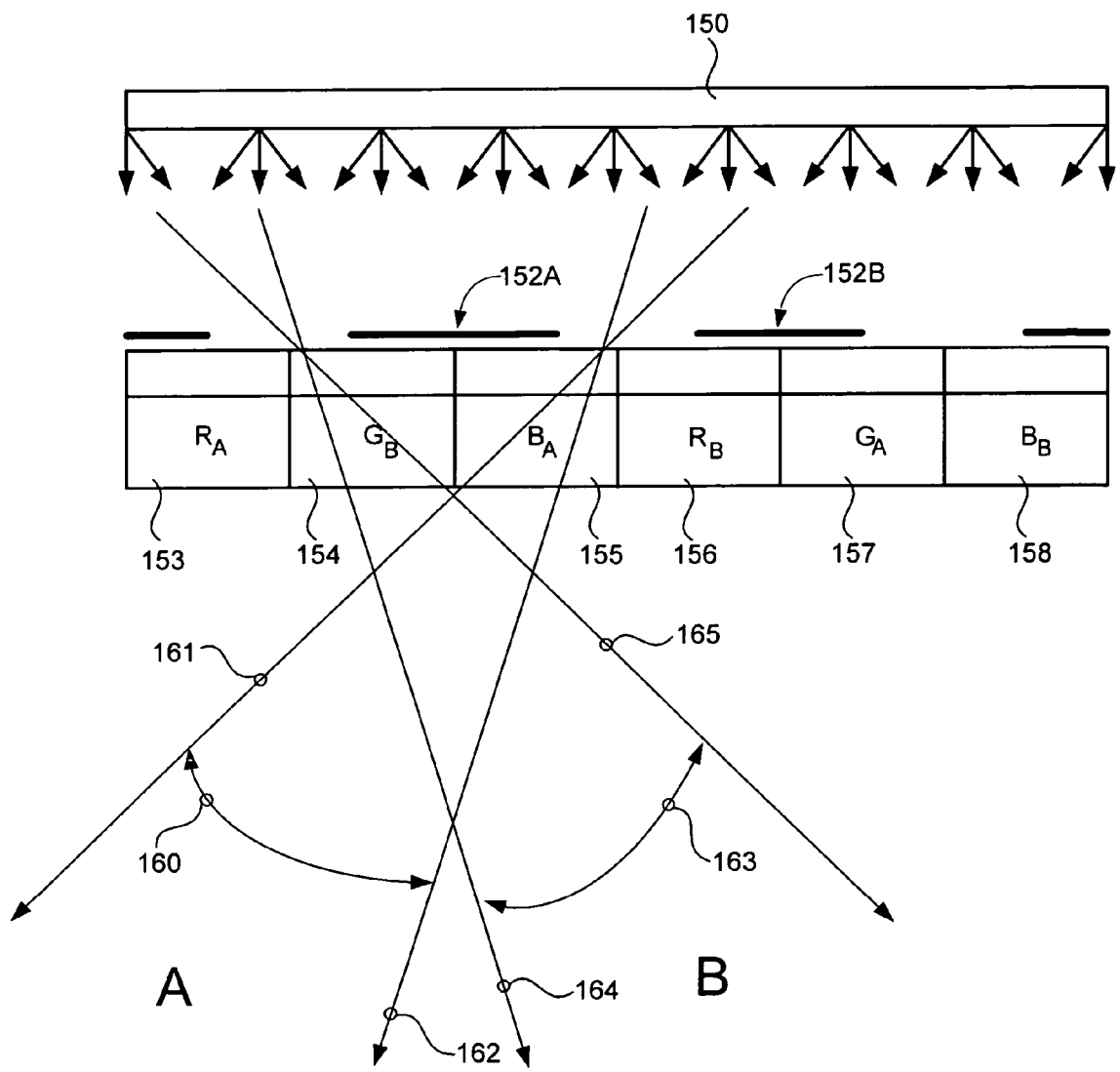
FIG. 15 is a diagram showing the light paths through one type of multiple-view display.

A multiple-view display 144, illustrated in FIG. 14, can display more than one view simultaneously. In the exemplary display 144 of FIG. 14, two views are displayed simultaneously. A left viewer 140 to the left side of the display can see a left-side image "A" from within a left-side viewing area 145, while, at the same time, a right-side viewer 142 can see a right-side image "B" from a right-side viewing area 146. It is important to note that both images "A" and "B" are displayed using the same light source.

Some multiple-view displays may comprise a backlight 150, an opaque mask or screen 152 and individually addressable pixel or sub-pixel elements 153-158. As in a single-view display, the backlight 150 radiates light through the sub-pixel elements 153-158 to a viewer that perceives an image that is registered by the sub-pixel elements 153-158. Unlike single-view displays, these multiple-view displays also comprise a mask or screen 152. The mask or screen functions to restrict light passing through the sub-pixel elements 153-158 so that each sub-pixel can only be seen by a viewer in one of the viewing areas 160 & 163. For example, mask 152A restricts light passing through green sub-pixel 154 such that the modulated light passing through it can only be seen by a viewer in right viewing area 163, which is bounded by lines 164 & 165. Similarly, mask 152A restricts light from backlight 150 as it passes through sub-pixel element 156 such that the modulated light passing through sub-pixel 156 can only be seen by a viewer in left viewing area 160, which is bounded by lines 161 & 162. This pattern is repeated for each sub-pixel on the display so that each pixel or sub-pixel is directed to one of the multiple-views of the display. Generally, the addressing pattern is configured to avoid artifacts in the displayed images.

Figure 16:
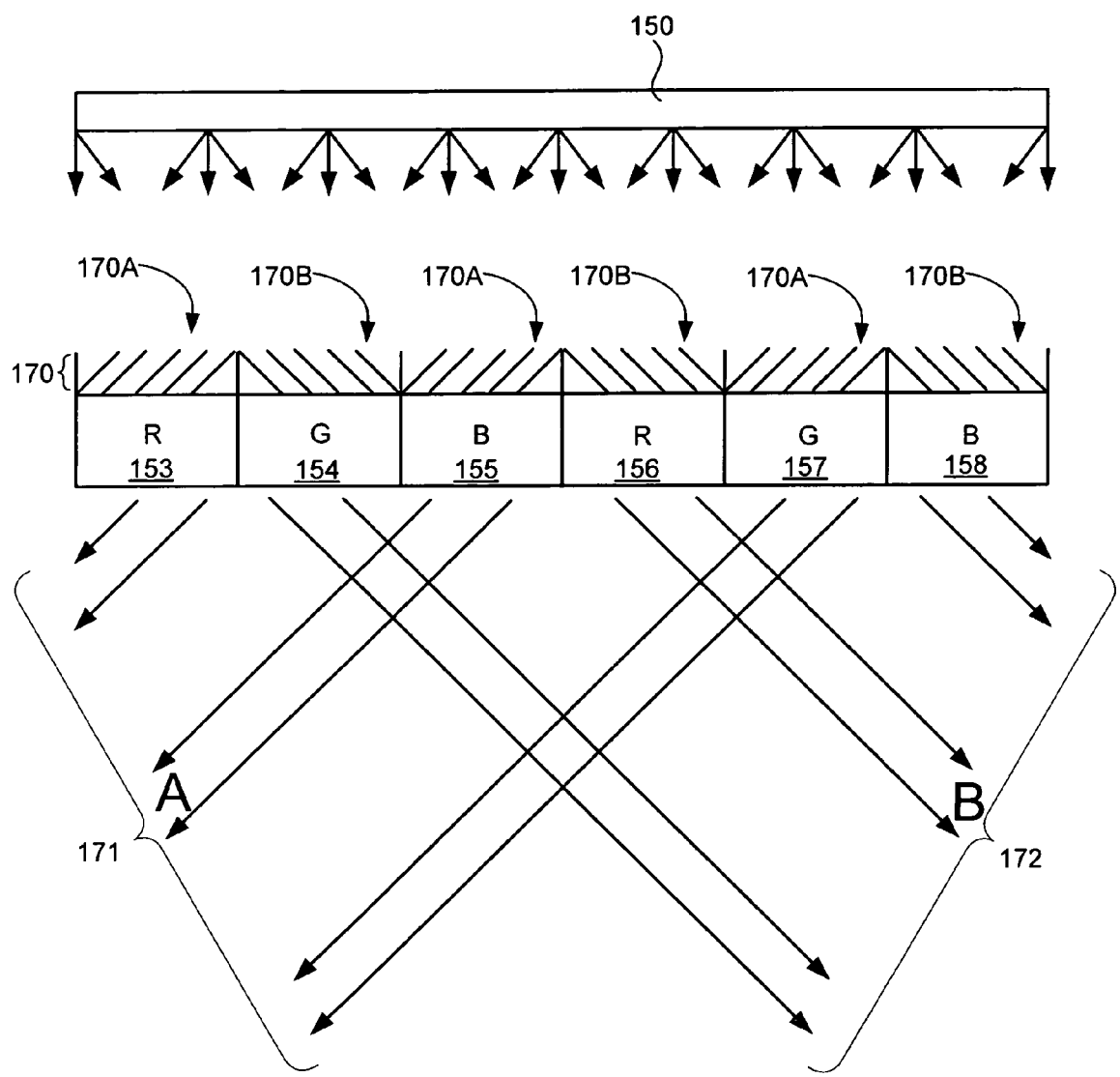
FIG. 16 is a diagram showing the light paths through another type of multiple-view display.

Similar, multiple-view display embodiments are illustrated in FIG. 16. In these embodiments, light from a light source 150 passes through a light channeling interface 170, which is constructed to directionally channel light through sub-pixels 153-158 toward a single viewing area for a single view. In this exemplary figure, "A" portions 170A of the light channeling interface are oriented and configured to channel light through sub-pixels 153, 155 & 157 toward viewing area A, 171. Other portions 170B of the light channeling interface are oriented and configured to channel light through sub-pixels 154, 156 & 158 toward viewing area B, 172. A light channeling interface may comprise any structure that is capable of channeling light in a specific direction. Some light channeling interfaces may comprise a parallax barrier, a refractive layer, a reflective array and other elements.

Using traditional, known techniques that adjust the brightness using the backlight, the brightness of the two views cannot be adjusted independently. However, using embodiments of the present invention, the brightness, contrast or other attributes of any view or section of a view can be adjusted independently of any other view or view section.

Figure 17:
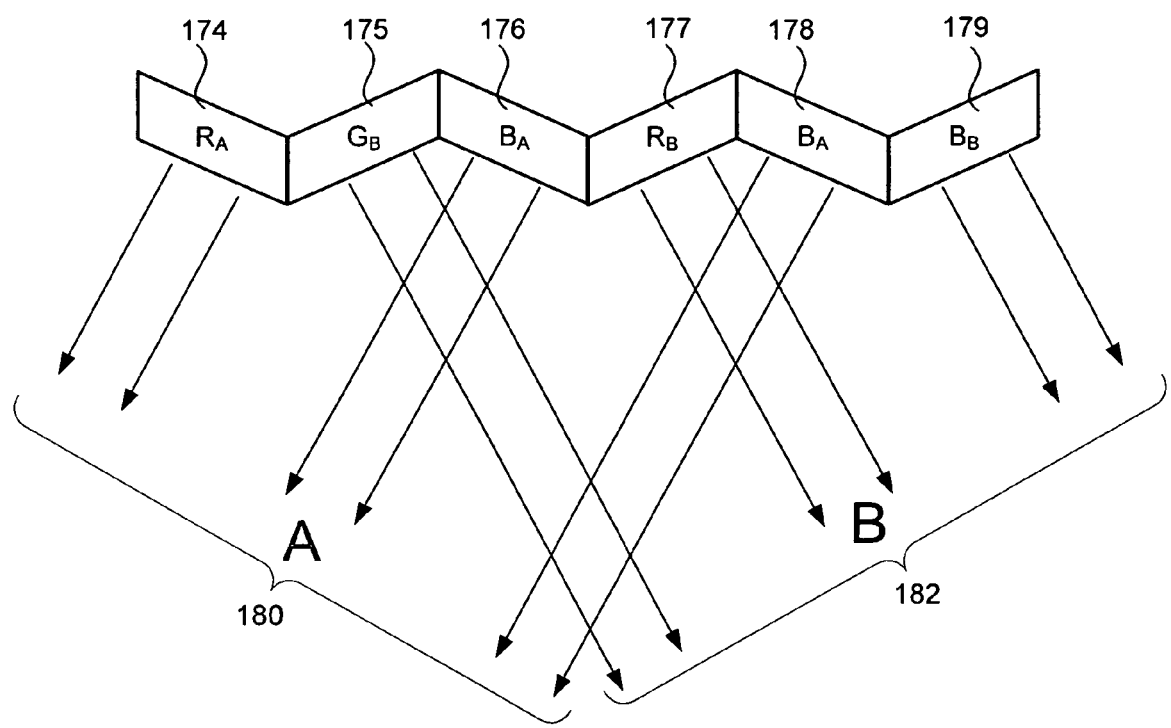
FIG. 17 is a diagram showing the pixel orientation of a multiple-view display with light-emitting pixels.

Still other embodiments of the present invention may be described with reference to FIG. 17. In these embodiments, light-emitting pixels are used in the display to form an image. In some embodiments, these pixels may be Light Emitting Diodes (LEDs). In a multiple-view, light-emitting pixel display, the pixels may be oriented to emit light in the direction of a specific view. In the embodiments shown in FIG. 17, a first set of pixels 174, 176 & 178 is oriented to emit light toward a left view "A" 180 and a second set of pixels 175, 177 & 179 is oriented to emit light toward a right view "B" 182. Using embodiments of the present invention, the values assigned to pixels related to any view may be adjusted, as explained above, to change the brightness, contrast or other characteristics of the view image. In these embodiments, instead of adjusting the amount of light that passes through a light-valve, the amount of light emitted from a pixel is adjusted with the code value. These embodiments may be used with other types of multiple-view displays with light-emitting pixels, such as plasma displays and others. Multiple-view displays with light-emitting pixels may also use a parallax barrier on the outer surface of the pixel grid to direct the emitted light toward a particular view instead of or in addition to orienting pixels geometrically to direct their emitted light to a particular view.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for adjusting the brightness of a first view in a multiple-view display independently of a second view in said multiple-view display, said method comprising:
   a) displaying a first image with a first array of pixels in said multiple-view display, wherein said first array of pixels is configured to be seen from a first viewing area;
   b) displaying a second image with a second array of pixels in said multiple-view display, wherein said second array of pixels is configured to be seen from a second viewing area;
   c) adjusting a first code value of said first image that is displayed with said first array of pixels independently of a second code value of said second image that is displayed with said second array of pixels to effect a visually-perceptible change in said first image as displayed with said first array of pixels wherein said visually-perceptible change is independent of any change in said second image displayed with said second array of pixels; and
   d) wherein said adjusting said first code value of said first image that is displayed with said first array of pixels comprises creating a first low-pass image and a first high-pass image from said first image, applying a tone scale operation to said first low-pass image thereby creating an adjusted first low-pass image, applying a constant positive gain operation to said first high-pass image thereby creating an adjusted first high-pass image and combining said adjusted first low-pass image with said adjusted first high-pass image.

2. A method as described in claim 1 wherein said tone scale operation effects a constant gain to all pixel code values in said first low-pass image that are below a function transition point (FTP) and effects a roll-off curve operation to pixel code values in said first low-pass image that are above said FTP.

3. A method as described in claim 2 wherein said roll-off curve begins at said FTP and ends at an end point that maps the maximum code value to the maximum display level.

4. A method as described in claim 1 wherein said tone scale operation is dependent on a display gamma, an efficiency factor and a Function Transition Point (FTP).

5. A method for adjusting the brightness of a first view in a multiple-view display independently of a second view in said multiple-view display, said method comprising:
  a) displaying a first image with a first array of pixels in said multiple-view display, wherein said first array of pixels is configured to be seen from a first viewing area;
  b) displaying a second image with a second array of pixels in said multiple-view display, wherein said second array of pixels is configured to be seen from a second viewing area; and
  c) applying a tone scale adjustment model to a first code value of said first image that is displayed with said first array of pixels to produce a first tone scale adjusted image, wherein said tone scale adjustment model is applied independently of any second code values of said second image that are displayed with said second array of pixels;
  d) computing a first high-pass image and a first low-pass image from said first tone scale adjusted image;
  e) applying a positive gain map function to said first high-pass image to produce a first adjusted high-pass image; and
  f) combining said first low-pass image and said first adjusted high-pass image to form a first enhanced image that is enhanced independently of said second image displayed with said second array of pixels.

6. A method as described in claim 5 wherein said applying a tone scale adjustment model comprises adjusting a first set of said first code values to increase the perceived brightness of at least a portion of said first array of pixels by applying a gain factor function; and adjusting a second set of said first code values according to a transition function that transitions from said gain factor function to no gain at a maximum value point.

7. A method as described in claim 5 wherein the magnitude of said gain function is mathematically related to the slope of the tone scale adjustment model.

8. A method as described in claim 5 wherein said gain map function at a specific code value has a magnitude that is proportional to the ratio of the slope of the tone scale adjustment model below an FTP and the slope of the tone scale adjustment model at said specific code value.

9. A method for adjusting the brightness of a first view in a multiple-view display independently of a second view in said multiple-view display, said method comprising:
  a) displaying a first image with a first array of pixels in said multiple-view display, wherein said first array of pixels is configured to be seen from a first viewing area;
  b) displaying a second image with a second array of pixels in said multiple-view display, wherein said second array of pixels is configured to be seen from a second viewing area; and
  c) filtering a first set of code values of said first image to create a first set of low-pass image code values and a first set of high-pass image code values;
  d) adjusting said first set of code values of said first image that are displayed with said first array of pixels independently of a second set of code values of said second image that are displayed with said second array of pixels by applying a tone scale adjustment model to said first set of low-pass image code values to create a first set of adjusted low-pass image code values;
  e) applying a constant positive gain factor to said first set of high-pass image code values to form a first set of adjusted high-pass image code values;
  f) combining said first set of adjusted LP image code values and said first set of adjusted HP image code values to form a first set of enhanced view image code values; and
  g) displaying said first set of enhanced view image code values with said first array of pixels in said multiple-view display.

10. A method as described in claim 9 wherein said applying a tone scale adjustment model comprises applying a constant gain multiplier to a first set of said first low-pass image code values and applying a roll-off curve to a second set of said first low-pass image code values.

11. A method as described in claim 9 wherein said applying a tone scale adjustment model comprises applying a gain adjustment to first set of said first low-pass image code values below an MFP point and applying a roll-off curve to a second set of first low-pass image code values above said MFP point.

12. A method as described in claim 9 wherein said applying a constant gain factor comprises applying a gain factor with a magnitude that is related to the slope of the tone scale adjustment model.

13. A method as described in claim 9 wherein said applying a constant gain factor comprises applying a gain factor with a magnitude, at a specific code value, that is proportional to the ratio of the slope of the tone scale adjustment model below an FTP and the slope of the tone scale adjustment model at said specific code value.

* * * * *